A. L. ETHERINGTON.
SPRING SEAT.
APPLICATION FILED FEB. 7, 1917.
1,281,921.
Patented Oct. 15, 1918.
2 SHEETS—SHEET 1.
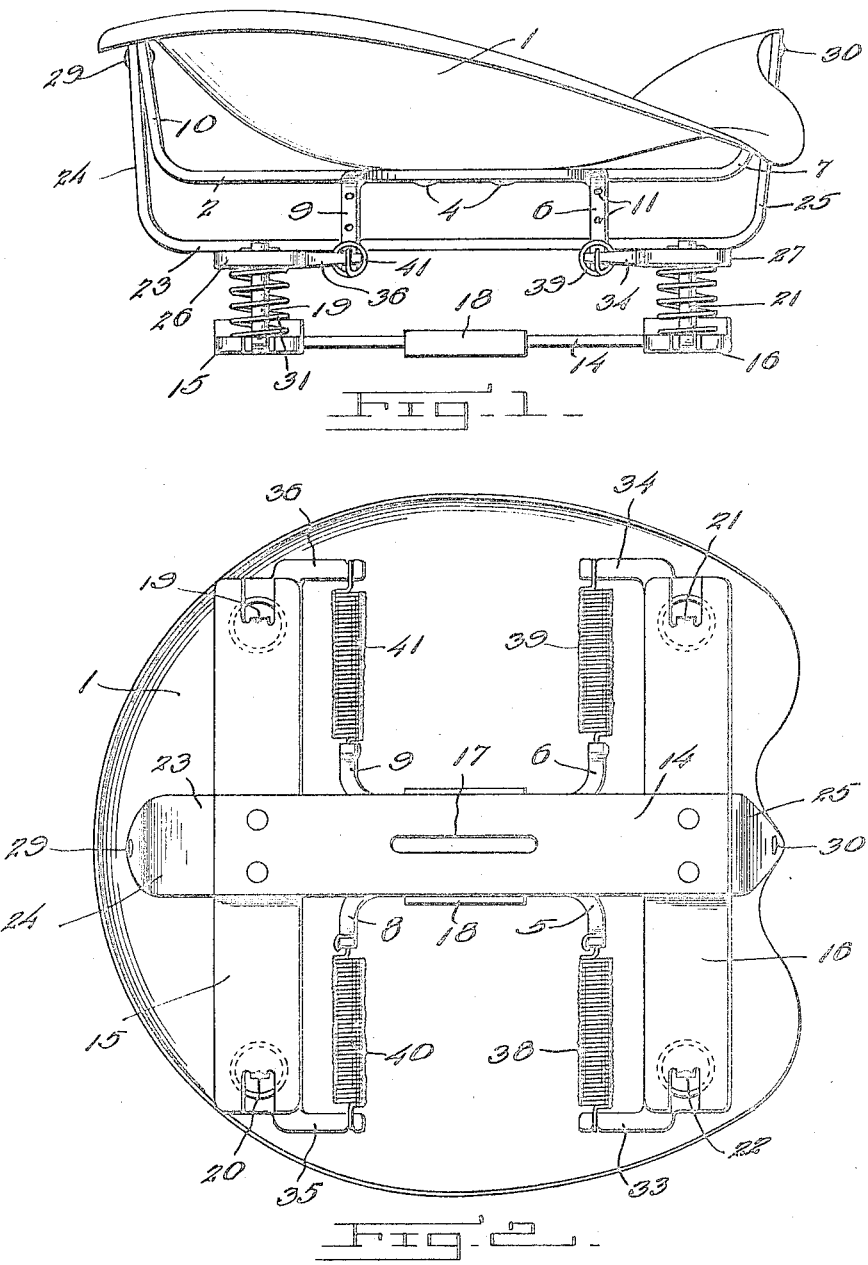
WITNESSES
INVENTOR
Alfred L. Etherington
BY
ATTORNEY

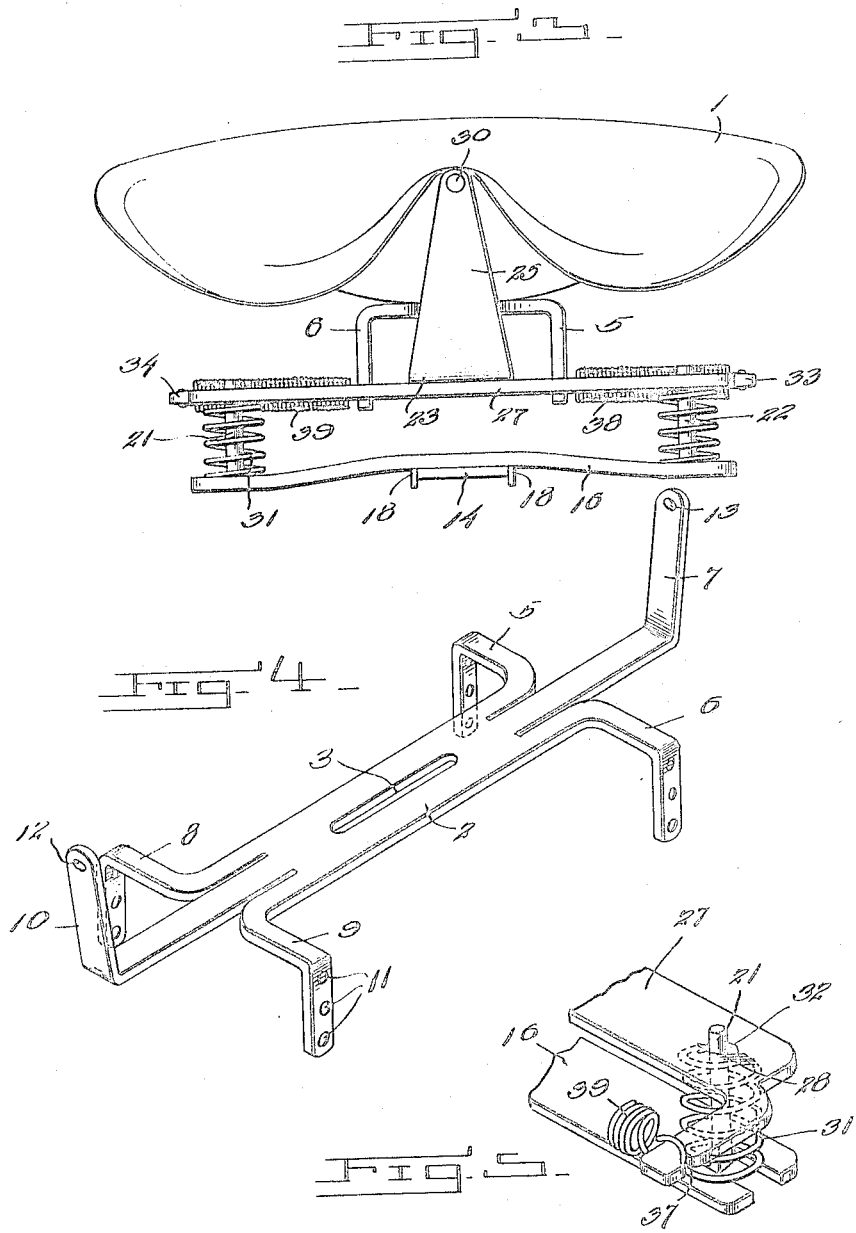

ALFRED L. ETHERINGTON, OF MILTON, NOVA SCOTIA, CANADA.

SPRING-SEAT.

1,281,921.

Specification of Letters Patent.

Patented Oct. 15, 1918.

Application filed February 7, 1917. Serial No. 147,217.

*To all whom it may concern:*

Be it known that I, ALFRED L. ETHERINGTON, subject of the King of Great Britain, residing at Milton, in the Province of Nova Scotia, Dominion of Canada, have invented certain new and useful Improvements in Spring-Seats, of which the following is a specification.

This invention relates to improvements in spring seats, and more particularly to seats of a character disclosed in Patent 1,093,042, granted to me on April 14, 1914, and over which the present form of seat shows material changes and improvements.

An object of my invention is to provide a spring seat which can be applied for use upon an agricultural implement, a farm wagon, or any other vehicular machine, and which has the parts thereof so arranged that as the machine is moved over rough or uneven ground or road, the seat will shift to compensate for the unevenness of the surface and will at the same time cushion the shocks imparted thereto.

A further object resides in constructing the parts of the mounting and structure for the seat in such a manner that the various members of the body can be made of sheet or scrap metal cut and shaped to the proper form and a suitable number of parts will be applied in making up the complete seat structure and supporting structure, while the supporting and construction parts are so arranged that the seat can be used by being bolted upon a standard or other support through the construction structure, or can be used upon a wagon by being placed upon bags with which the wagon has been filled, across the bed of the wagon, or upon the material being hauled.

Yet another object resides in so arranging the parts that adjustments may be made for various operating conditions and also the parts may be set to meet the demands for each individual user.

With the above and other objects in view my invention consists in certain novel features of construction and combination of parts which are hereinafter set forth in connection with the drawings and more particularly pointed out in the claims.

In the drawings:—

Figure 1 is a view in side elevation of a seat constructed after the manner of my invention.

Fig. 2 is a bottom plan view of the seat to better show the arrangement of the support structure.

Fig. 3 is a view in front elevation.

Fig. 4 is a perspective view showing the seat carrying member.

Fig. 5 is a fragmentary perspective view, to illustrate the manner of forming certain of the parts and of connecting shock absorbing spring.

The seat 1 is made of a saddle type or of any desired form, and this seat proper can be formed of a piece of sheet metal brought to the proper shape, or can be made up of a casting, or formed in any other desired and suitable manner. A seat carrying member 2 the details of which are better disclosed in Fig. 4, has a slotted opening 3 formed longitudinally at substantially the center thereof, and bolts 4 are passed through the slotted opening and through openings in the seat member 1 to thus rigidly secure the seat member upon this seat supporting member 2. The member 2 is preferably made of sheet metal or of scrap metal, and is slitted or cut at each end to provide the stops 5 and 6 and a supporting upright 7 at one end and like parts 8, 9, and 10, at the remaining end. The stops 5 and 6 and 8 and 9, at the two ends of the number 2, are bent outwardly and then downwardly, in the manner shown in Fig. 4, and the ends of the parallel downwardly bent portions are provided with the openings 11, each of the stops having a plurality of these openings arranged in spaced relation. The supporting portions 7 and 10 of the number 2 are extended in line with the main body of the number 2 for a slight distance beyond the point from which the stops are bent outwardly, and these portions 7 and 10 are then bent upwardly and at their extremities provided with the openings 13 and 12. It is of course to be understood that the bolts 4 secure the seat member 1 upon the supporting member 2 in such a manner that the stops 5, 6, 8, and 9 have the downwardly extending ends thereof disposed beneath the seat while the upwardly disposed portions 7 and 10 are at the forward and the back sides of the seat member. As has been stated, it is preferable that the seat member be made of a standard type, and when this form of seat is employed the supporting portions 7 and 10 will not project above the top surface of the seat and will be embraced within the outline of the same.

A supporting base structure which is substantially H-shaped in plan embraces the center bar 14 having the cross bars 15 and 16 secured at the ends thereof to provide the laterally extending arms. The central bar 14 and the cross bars 15 and 16 are made of such length that the entire base structure is not given greater dimensions than the size of the seat member 2. The central member has a slotted opening 17 formed longitudinally therein and in the mounting of the support base structure, bolts, rivets, or other suitable fastenings can be placed through the slotted opening 17 and the base structure can thus be mounted upon a rigid support, upon the usual spring as now generally provided upon agricultural implements, or upon other desired supporting means. A clip 18 is here shown as fitted over the central member or bar 14 and extending down at its edges so that the base structure be fitted and mounted to be rigidly held, this clip 18 will secure the same against shifting movement. As has been stated before, the seat is intended to be used in a number of various connections, and to permit ready application of the seat structure upon a flat surface such as the body of a wagon bed, a board placed across the bed, or the placing of the same upon sacks or other material as being hauled in a wagon, it is preferable that a substantially smooth or flat surface be provided entirely across the base of the supporting structure. To accomplish this purpose, I bow up the cross bars 15 and 16 after the manner shown in Fig. 3, and then the thickness of the central bar or member 14 is compensated for and the ends of the cross bars 15 and 16 and this central member 14 have their lower faces in substantially the same plane. The ends of the cross bars 15 and 16 are shaped to provide the tongues 19, 20, 21, and 22, which are bent upwardly to extend substantially at right angle to the plane in which the numbers of the base structure lie.

An intermediate supporting structure includes a central rib member 23 which at its ends is bent upwardly to form the bearing arms 24 and 25, which are made of somewhat greater length than the upwardly bent extensions 7 and 10 of the seat supporting member 2. Cross bars 26 and 27 are mounted and rigidly secured in connection with this rib member 23 in such relation that they present a substantially H-shaped form corresponding to the form of supporting base structure. The cross bars 26 and 27 have their ends extended to be of substantially the same length as the bars 15 and 16 of the supporting base structure, and adjacent their ends these bars 26 and 27 have the openings 28 to receive the upper ends of the tongue like extensions 19, 20, 21, and 22, which are bent up from the cross bars 15 and 16 of the base structure.

The bearing arm portions 24 and 25 of the rib members 23 are provided at their ends with bearing openings, and rivets, pivot pins, or other suitable members, 29 and 30 are passed through these openings and through the openings 12 and 13 of the extensions 10 and 7 to thus mount the seat supporting member upon the intermediate supporting structure in such a relation that the seat is mounted between the bearing arms 24 and 25 to be suspended by the rivets or pins 29 and 30. As the weight is placed evenly upon the seat, the seat supporting member 2 will be substantially over the rib member 23, and the stops 5 and 8 on the one side of this rib member and stops 6 and 9 on the remaining side will be spaced substantially equally from the rib member. When the rib member is shifted to be disposed with the bearing arms 24 and 25 at an angle from the vertical lines which they normally occupy, or when the weight upon the seat 1 is shifted, the relative position of the seat supporting member 2 and the rib member 23 will be varied. However, excessive tilting or rolling movement of the seat 1 with respect to the intermediate supporting structure is not permitted due to the fact that the stops 5, 6, 8 and 9, are disposed to extend adjacent the rib member 23 and will strike thereagainst when the seat rolls excessively.

As has been stated, the openings 28 are provided at the ends of the cross bars 26 and 27 to receive the tongue like extensions 19, 20, 21, and 22 which are bent up from the cross bars 15 and 16 of the supporting base structure, and load springs 31 are mounted around these tongue like extensions between the ends of the cross bars 15 and 16 of the supporting base structure and the correspondingly placed bars 26 and 27 of the intermediate supporting structure. The tongue like extensions of the bars 15 and 16 have free sliding movement in the openings 28 and thus the springs 31 are disposed as the only support between the intermediate structure and the base structure. It will of course be understood that these springs 31 are to be made sufficiently strong so that the weight of a person sitting upon the seat member 1 will not bring the cross bars of the intermediate structure against the cross bars of the supporting structure. However, the springs must not be made so strong that they will act stiffly and that only excessive weight will cause them to be suppressed as these springs 31 act as the sole cushioning means for the seat. Cotter pins 32, or other suitable fastenings, are passed through the tongues 19, 20, 21, and 22, and thus excessive upward movement of the cross bars 26 and 27 from the bars 15 and 16 will be restrained.

With the parts formed and supported in the manner as set forth, the supporting base structure can be mounted to carry the seat member 1 in a position for use, the springs 31 will cushion shock which would otherwise be transmitted from the vehicle or machine upon which the seat is mounted to the seat member, and the stops 5, 6, 8, and 9 will limit the side rolling movement of the seat member. However, it is preferable that some means be provided to maintain the seat member 1 in the relation shown in Fig. 3 or in a centralized position, and to relieve the user of the responsibility of at all times maintaining a perfect balance within the seat. At the end of the cross bars 26 and 27, the extensions 33, 34, 35, and 36 are provided, and these extensions are bent inwardly to be disposed substantially at right angles to the longitudinal extent of the cross bars 26 and 27, the inner end of these extensions being notched as shown at 37, on the outer side. A stabilizing spring 38 is mounted between the extension 33 and stop 5, and a stabilizing spring 39 is mounted on the opposite side between the extension 34 and the stop 6, while spring 40 is connected between the extension 35 and the stop 8 and stabilizing spring 41 as connection 36 and stop 9. As has been stated, the stops have the plurality of openings 11 formed throughout the parallel portions thereof, and the stabilizing springs 38, 39, 40 and 41 are provided with hooked ends to be inserted in the openings 11. When the stabilizing springs are hooked through the openings nearest the extremities of these stop portions, the greatest drawing force will be exerted against the arm due to the fact that greater leverage will be obtained, and on the other hand when the uppermost openings 11 have the stabilizing springs hooked therein the holding action exerted by the springs will be materially decreased. These stabilizing springs act only to resiliently oppose rolling movement of the seat member 1 and to secure the same in the centralized position as indicated in Fig. 3, and the stabilizing springs do not exert any force which acts to cushion or support the load. The several stabilizing springs at those ends which have connections with the extensions with the cross bars 26 and 27 are provided with ring or hooked formations to be received in the notches 37, and as the springs are always in tension, accidental or casual displacement of the stabilizing springs from the mounting is prevented.

From the foregoing it will be seen that I have provided a seat structure which adapts itself for application and use upon wagons, agricultural implements, or other vehicular machines, and which presents the parts in such a manner that the seat can be placed upon bags of grain or other material contained in the wagon, or can be mounted in any other relation desired and none of the parts thereof will project beyond the supporting base structure in such relation that the bags or other material would be injured, and also it will be apparent that the stabilizing springs can be adjusted to suit the individual requirements or at the will of the user to thus maintain the equilibrium of the seat member while permitting rolling movement thereof. The rolling movement permitted by the mounting of the seat supporting member through the medium of the pins or rivets 29 and 30 is supplemented by reason of the fact that the tongue like extensions 19, 20, 21, and 22, are passed loosely through the openings 28, so that as the weight of the party using the seat is shifted through unevenness in the ground or through any other cause, the seat supporting member and the intermediate supporting structure will both have movement to compensate for the unequal distribution of the weight and then will return to the normal position when the weight is again equally distributed.

I claim:—

1. A spring seat comprising a base, a plurality of transversely extending bars carried by said base, a second series of transversely extending bars supported above said first mentioned transversely extending bars, said first mentioned transversely extending bars provided with upwardly extending tongues bent from the ends thereof at a point located inwardly with respect to the outer end of said first mentioned transversely extending bars, said second series of transversely extending bars provided with inwardly projecting extensions, said tongues projecting through said second series of transversely extending bars, springs interposed between said bars and yieldably supporting said bars in spaced relation, a seat, a seat carrying member secured to said seat and provided with outwardly extending fingers terminating in upwardly extending integral ends engaging said seat, said seat carrying member provided with projecting shank portions terminating in laterally extending stop portions formed integral therewith, said stop portions provided with depending integral ends, stabilizing springs adjustably secured to said depending ends and engaging said extensions of said second mentioned set of transversely extending bars for assisting in maintaining said seat in a level position, and an intermediate supporting member secured to said second set of transversely extending bars and pivotally engaging said seat for constituting an efficient support therefor.

2. A spring seat comprising a base, said base provided with a plurality of transversely extending bars, a second series of bars supported above the first mentioned bars, yieldable means for supporting said bars, yieldable means for supporting said second series of bars upon said first mentioned bars, integral tongues bent from said second series of bars near the ends thereof and projecting through said first mentioned bars, said second series of bars provided with inwardly projecting extensions, a seat carrying member, said seat carrying member provided with depending ends, springs interposed between said depending ends and said inwardly extending ends for yieldably and normally holding said seat in a level position, an intermediate seat supporting member, and said springs extending normally in line with said intermediate seat supporting member out of contact with said seat as the same swings from side to side.

In testimony whereof I affix my signature in presence of two witnesses.

ALFRED L. ETHERINGTON.

Witnesses:
 JOHN GEORGE PYKE,
 PATRICK B. MCAULIFFE.